United States Patent
Clark et al.

(10) Patent No.: US 8,860,197 B2
(45) Date of Patent: Oct. 14, 2014

(54) INTEGRATED CIRCUITS SECURE FROM INVASION AND METHODS OF MANUFACTURING THE SAME

(75) Inventors: Lawrence T. Clark, Phoenix, AZ (US); David R. Allee, Phoenix, AZ (US)

(73) Assignee: Arizona Board of Regents, a Body Corporate of the State of Arizona Acting for and on Behalf of Arizona State University, Scottsdale, AZ (US)

( * ) Notice: Subject to any disclaimer, the term of this patent is extended or adjusted under 35 U.S.C. 154(b) by 560 days.

(21) Appl. No.: 13/139,955

(22) PCT Filed: Dec. 29, 2009

(86) PCT No.: PCT/US2009/069732
§ 371 (c)(1),
(2), (4) Date: Jun. 15, 2011

(87) PCT Pub. No.: WO2010/104543
PCT Pub. Date: Sep. 16, 2010

(65) Prior Publication Data
US 2012/0140929 A1    Jun. 7, 2012

Related U.S. Application Data

(60) Provisional application No. 61/142,023, filed on Dec. 31, 2008.

(51) Int. Cl.
*H01L 23/02* (2006.01)
*H01L 23/06* (2006.01)
(Continued)

(52) U.S. Cl.
CPC ... *H01L 23/3121* (2013.01); *H01L 2924/01087* (2013.01); *H01L 2924/014* (2013.01); *H01L 2924/14* (2013.01); *H01L 2924/0103* (2013.01); *H01L 2924/01049* (2013.01); *H01L 29/0657* (2013.01); *H01L 2224/13099* (2013.01); *H01L 2924/01005* (2013.01); *H01L 21/56* (2013.01); *H01L 24/17* (2013.01); *H01L 2924/01029* (2013.01); *H01L 23/13* (2013.01); *H01L 2924/01006* (2013.01); *H01L 23/57* (2013.01); *H01L 2224/48091* (2013.01); *G06F 21/79* (2013.01); *H01L 2224/16* (2013.01); *G06F 21/87* (2013.01); *H01L 23/49833* (2013.01); *H01L 2924/01033* (2013.01); *H01L 24/48* (2013.01)
USPC .......................................... 257/679; 257/684

(58) Field of Classification Search
CPC ............................. H01L 23/57; H01L 21/56
USPC .................................................. 257/679, 684
See application file for complete search history.

(56) References Cited

U.S. PATENT DOCUMENTS 6,117,704 A    9/2000   Yamaguchi et al.
6,331,946 B1 *   12/2001   Silverbrook et al. .... 365/185.04
(Continued)

FOREIGN PATENT DOCUMENTS

WO    2007017838    2/2007

OTHER PUBLICATIONS

International Preliminary Report Patentability for Int'l Application No. PCT/US2009/069732, Jul. 14, 2011.
(Continued)

*Primary Examiner* — Nicholas Tobergte
(74) *Attorney, Agent, or Firm* — Bryan Cave LLP

(57) ABSTRACT

An integrated circuit device that is secure from invasion and related methods are disclosed herein. Other embodiments are also disclosed herein.

18 Claims, 6 Drawing Sheets

(51) Int. Cl.
   *H01L 29/06* (2006.01)
   *H01L 21/56* (2006.01)
   *H01L 23/31* (2006.01)
   *H01L 23/00* (2006.01)
   *H01L 23/13* (2006.01)
   *G06F 21/79* (2013.01)
   *G06F 21/87* (2013.01)
   *H01L 23/498* (2006.01)

(56) References Cited

U.S. PATENT DOCUMENTS

| | | | |
|---|---|---|---|
| 6,414,884 B1 * | 7/2002 | DeFelice et al. | 365/195 |
| 6,706,971 B2 | 3/2004 | Albert et al. | |
| 7,005,733 B2 * | 2/2006 | Kommerling et al. | 257/679 |
| 7,220,915 B1 | 5/2007 | Park et al. | |
| 7,268,577 B2 * | 9/2007 | Erickson et al. | 326/8 |
| 7,535,373 B2 * | 5/2009 | Dalzell | 340/652 |
| 2002/0091640 A1 | 7/2002 | Gupta | |
| 2005/0004873 A1 | 1/2005 | Pou et al. | |
| 2006/0087883 A1 * | 4/2006 | Ozguz et al. | 365/185.04 |
| 2007/0117276 A1 | 5/2007 | Chen et al. | |

OTHER PUBLICATIONS

International Search Report from corresponding application No. PCT/US09/69732, 12 pages. Sep. 29, 2010.

* cited by examiner

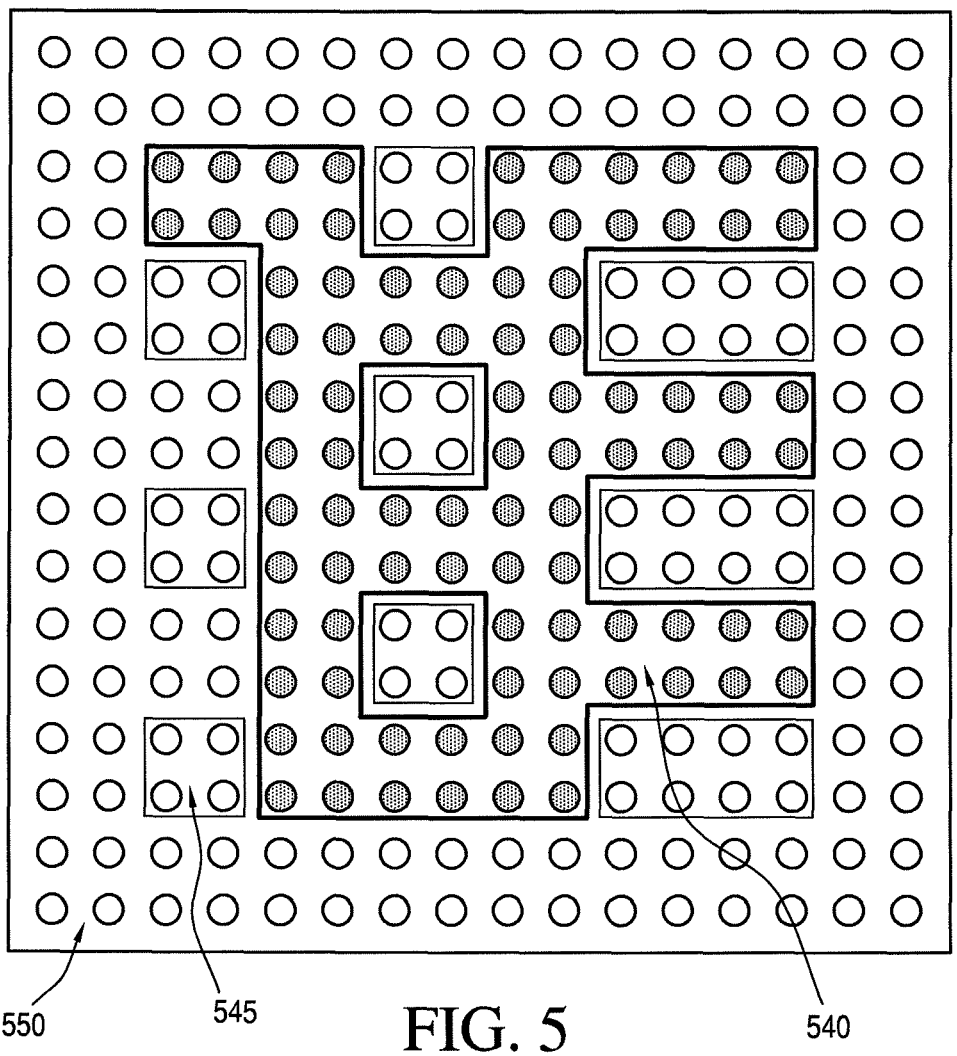
550  545  FIG. 5  540
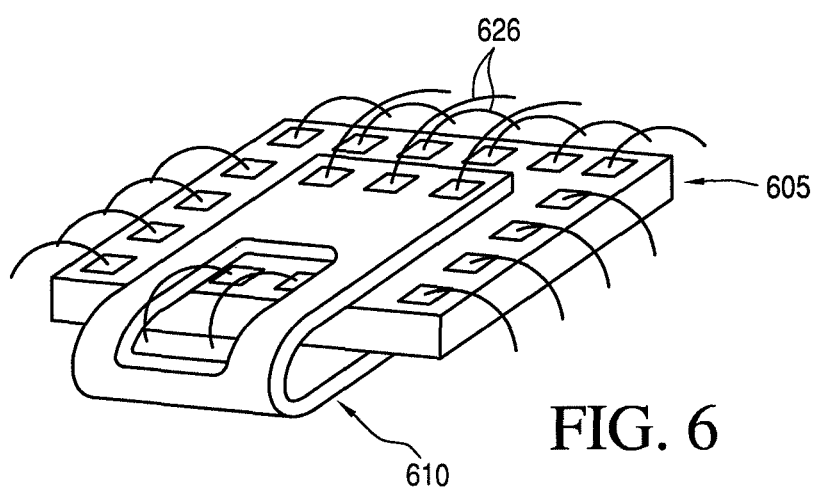
FIG. 6

INTEGRATED CIRCUITS SECURE FROM INVASION AND METHODS OF MANUFACTURING THE SAME

CROSS REFERENCE TO RELATED APPLICATION

This application is a national stage application of PCT Application No. PCT/US2009/069732, filed Dec. 29, 2009, which claims the benefit of U.S. Provisional Application No. 61/142,023, filed on Dec. 31, 2008. PCT Application No. PCT/US2009/069732 and U.S. Provisional Application No. 61/142,023 are incorporated herein by reference.

STATEMENT REGARDING FEDERALLY SPONSORED RESEARCH OR DEVELOPMENT

The U.S. Government has a paid-up license in this invention and the right in limited circumstances to require the patent owner to license to others on reasonable terms as provided by the terms of Grant/Contact No. W911NF-04-2-0005 by the Army Research Lab (ARL).

FIELD OF THE INVENTION

The present invention relates generally to integrated circuits. More particularly, the present invention relates to integrated circuits that are secure from invasion and related methods thereof.

BACKGROUND OF THE INVENTION

Many integrated circuits are used to store sensitive or confidential information. Such information can include personal, government, or financial information. The technology for reverse engineering (including physical de-processing) integrated circuits and integrated circuit debugging has progressed to the point where the state of individual circuits can be read off of an operating microcircuit. Therefore, protecting integrated circuits from such intrusions, which may allow access to the sensitive or confidential information, is becoming increasingly important.

BRIEF DESCRIPTION OF THE DRAWINGS

To facilitate further description of the embodiments, the following drawings are provided in which:

FIG. 5 is a top view of another example of a semiconductor chip of the integrated circuit device according to the embodiment of FIG. 3;

FIG. 6 is a perspective view of an example of an integrated circuit device according to another embodiment;

Figure 1:
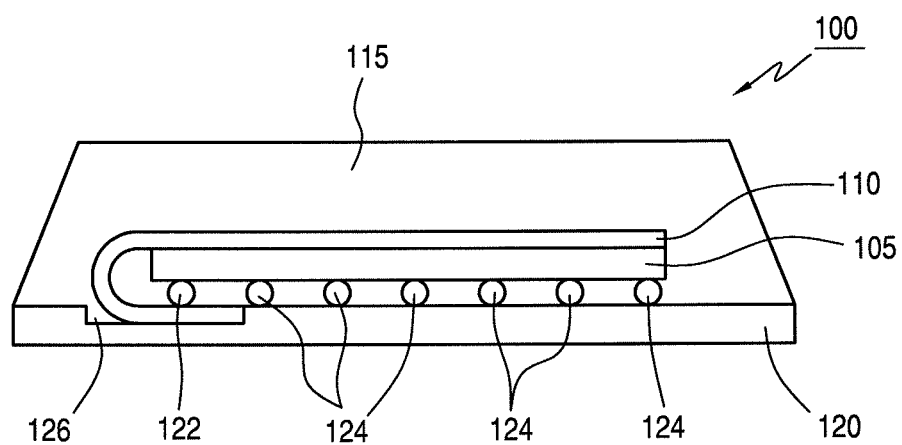
FIG. 1 is a cross-sectional view of an example of an integrated circuit device according to an embodiment.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, electrically, mechanically and/or otherwise. Two or more electrical elements may be electrically coupled together but not be mechanically or otherwise coupled together; two or more mechanical elements may be mechanically coupled together, but not be electrically or otherwise coupled together; two or more electrical elements may be mechanically coupled together, but not be electrically or otherwise coupled together. Coupling may be for any length of time, e.g., permanent or semi-permanent or only for an instant.

An electrical "coupling" and the like should be broadly understood and include coupling involving any electrical signal, whether a power signal, a data signal, and/or other types or combinations of electrical signals. A mechanical "coupling" and the like should be broadly understood and include mechanical coupling of all types. The absence of the word "removably," "removable," and the like near the word "coupled," and the like does not mean that the coupling, etc. in question is or is not removable.

DETAILED DESCRIPTION

In a number of embodiments, an integrated circuit device can include: (a) an encapsulant; (b) a semiconductor chip; (c) a package substrate; and (d) a first security layer. The first security layer can include a memory and can be capable of storing at least part of a security key. The first security layer also can be electrically coupled to the semiconductor chip, and the semiconductor chip can be electrically coupled to the package substrate. The encapsulant can cover portions of the semiconductor chip and the first security layer.

In another embodiment, a method of making an integrated circuit device can include: (a) electrically coupling a first security layer to a semiconductor chip; (b) electrically coupling the semiconductor chip to a package substrate; and (c) forming an encapsulant over the semiconductor chip and the first security layer such that the semiconductor chip and the first security layer are enclosed between the encapsulant and the package substrate. In this embodiment, the first security layer can be capable of storing a part of a security key.

In yet another embodiment, a method of using an integrated circuit device can include: (a) receiving a secure instrument on a semiconductor chip; (b) retrieving at least a portion of a security key from a memory of a first security layer located off of the semiconductor chip; (c) sending the at least a portion of the security key to the semiconductor chip; and (d) using the at least a portion of the security key to decrypt the secure instrument.

Turning to the drawings, FIG. 1 illustrates an exemplary embodiment of a cross-section of integrated circuit device 100. In the same or different embodiments, integrated circuit device 100 can be considered an integrated circuit device with security from physical invasion. Device 100 comprises semiconductor chip 105, security layer 110, encapsulant 115, package substrate 120, and solder balls 122 and 124. The embodiment of integrated circuit device 100 and subsequent embodiments of integrated circuit devices described herein are merely exemplary and are not limited to the embodiment presented herein. Device 100 and the other devices can include many different examples and embodiments not specifically depicted or described herein.

Semiconductor chip 105 can comprise any known material used, or those developed hereafter, in manufacturing semiconductor chips, including, but not limited to, silicon or a compound semiconductor such as, for example, gallium arsenide or indium phosphide. Semiconductor chip 105 can comprise an integrated circuit, and the integrated circuit can comprise a circuit that stores or processes secure information. For example, the integrated circuit can comprise a smart card controller, a flash memory, an encryption or decryption processor, and/or a Field-Programmable Gate Array (FPGA). Semiconductor chip 105 is electrically coupled to security layer 110 and package substrate 120, as explained later.

Package substrate 120 can comprise any material commonly used as a substrate. Package substrate 120 couples semiconductor chip 105 to other components. For example, package substrate 120 can be a metal leadframe, a glass/epoxy laminate such as FR-4 printed circuit board (PCB), or a ceramic substrate with metal tracings. When package substrate 120 comprises a PCB or a ceramic substrate, device 100 can also include solder balls at the side of package substrate 120 that faces away from semiconductor chip 105. Package substrate 120 can be configured to electrically couple to a larger printed circuit board (not shown) or other substrate, thus allowing semiconductor chip 105 to communicate with other components (such as, for example, semiconductor chips or discrete devices) on the printed circuit board. In the embodiment of FIG. 1, package substrate 120 includes a recess 126 for a portion of security layer 110. In one embodiment, a top surface of package substrate 120 is substantially planar with a top surface of a portion of security layer 110 while the portion of security layer 110 is located in recess 126.

In addition, device 100 also comprises security layer 110. Security layer 110 can comprise a flexible layer. As an example of a flexible layer, security layer 110 can comprise a plastic. Examples of plastics can include: polyethylene naphthalate (PEN), polyethylene terephthalate (PET), polyehtersulfone (PES), polyimide, polycarbonate, cyclic olefin copolymer, or liquid crystal polymer. In one exemplary embodiment, security layer 110 comprises PEN.

Security layer 110 includes a circuit. The circuit can comprise a thin film transistor circuit. The thin film transistors can comprise amorphous silicon, nano-crystalline silicon, polycrystalline silicon, zinc oxide, mixed metal oxides, cadmium selenium, or organic materials.

Security layer 110 also can comprise a memory. The memory of the security layer 110 can be configured or otherwise adapted to store all of a security key or at least a portion of a security key. The security key can comprise a series of characters, a password, an algorithm, or any other device that is used for security purposes. As an example, the memory of security layer 110 can be a read only memory (ROM) or an electrically programmable memory. The ROM can be programmed in a variety of ways, for example, programming the memory at fabrication or by blowing fuses using high voltage. In one embodiment, the ROM can be made of fuses, and in this embodiment, the ROM can be programmed by blowing certain ones of the fuses. If on the other hand, security layer 110 comprises an electrically programmable memory, the memory can comprise an electrically programmable non-volatile memory. Regardless of the specific memory used in security layer 110, however, the memory can be located over a large portion of security layer 110 such that access to the information secured within the memory will remain secure if a portion of security layer 110 is compromised.

In embodiments of the present invention, security layer 110 can have transistors that have threshold voltages that degrade over time. Thin film transistors (TFTs) have this threshold voltage degradation characteristic. As an example, the threshold voltages of the TFTs degrade over time with use of the transistors, and in this embodiment, security for device 100 is increased because a hacker will need to use thousands of attempts to electrically probe and decipher the security key contained within the TFTs security layer 100. These thousands of uses of the TFTs will degrade the TFTs, which will eventually become inoperable and force the hacker to start over with a different device having a different security key contained within security layer 110.

The security layer will be located adjacent to the semiconductor chip. The security layer and the semiconductor chip also can be connected using an adhesive. As shown in the exemplary embodiment of FIG. 1, security layer 110 can be positioned adjacent to semiconductor chip 105. Furthermore, as also shown in FIG. 1, security layer 110 can be at the side of semiconductor chip 105 that is opposite of package substrate 120. In this embodiment, the memory of security layer 110 can be located at the side of security layer 110 that faces towards semiconductor chip 105 to improve the security of device 100. In other embodiments, the security layer can be adjacent to the semiconductor chip while being positioned between the semiconductor chip and the package substrate to further improve the security of device 100. In yet other embodiments, the security layer can be located adjacent to both the side of the semiconductor chip nearest to the package substrate and the side of the semiconductor chip opposite the package substrate.

FIGS. 1, 2, 3, 7, and 8 show a device having one or more security layers located at opposite sides of a semiconductor chip. Additionally, FIG. 6 shows a perspective view of a portion of an integrated circuit device with security layer 610 and semiconductor chip 605. Security layer 610 comprises a flexible layer and is capable of being shaped so it covers over half of both the top side and the bottom side of semiconductor chip 605. Semiconductor chip 605 and security layer 610 in FIG. 6 can be similar to semiconductor chip 105 and security layer 110, respectively, in FIG. 1.

The first security layer is electrically coupled to the semiconductor chip. This electrical coupling can be done in any number of ways. For example, gang bonding or thermosonic flip-chip bonding can be used to electrically couple together the security layer and semiconductor chip. Also, thermosonic bonding can be used because it requires a lower temperature, thereby reducing the possibility of damaging the security layer during the lower temperature bonding process.

When the security layer is coupled to the semiconductor chip with one of the methods mentioned above, the security layer will connect to the semiconductor chip via solder balls. In the exemplary embodiment depicted in FIG. 1, security layer 110 is bonded to semiconductor chip 105 via solder balls 122 to facilitate communication between security layer 110 and semiconductor chip 105. Solder balls 124, on the other hand, bond semiconductor chip 105 to package substrate 120 and facilitate communication and/or power between semiconductor chip 105 and the circuit board.

The security layer and the semiconductor chip also can be electrically coupled using tape automated bonding (TAB). An exemplary embodiment showing the use of TAB is shown in the cross-sectional view of FIG. 2. Device 200 has semiconductor chip 205, security layer 210, encapsulant 215, solder balls 222 and 225, and encapsulant 215. Semiconductor chip 205, security layer 210, and encapsulant 215 in FIG. 2 can be similar to semiconductor chip 105, security layer 110, and encapsulant 115 in FIG. 1. Details of the encapsulant are explained later.

Figure 2:
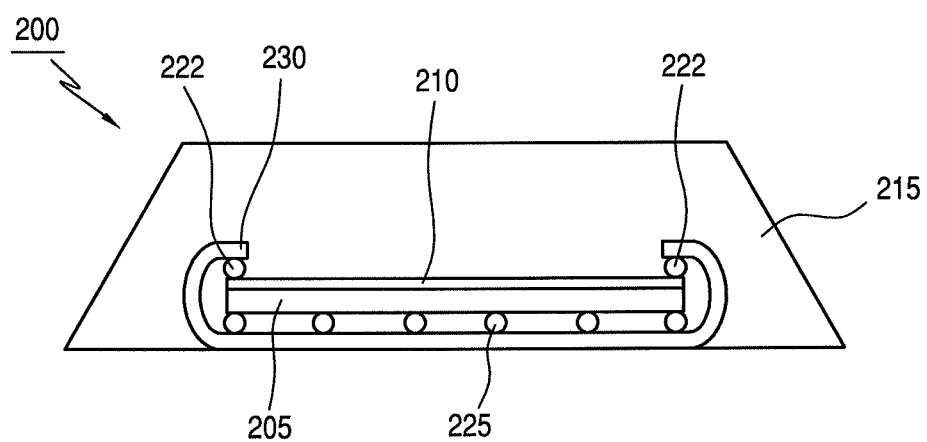
FIG. 2 is a cross-sectional view of an example of an integrated circuit device according to another embodiment.

TAB layer 230 in FIG. 2 is electrically coupled to security layer 210 via solder balls 222. TAB layer 230 can comprise a plastic material, such as, for example, polyimide. TAB layer 230 is capable of being bent up to approximately 180 degrees (°). TAB layer 230 communicates with the semiconductor chip 205 via solder balls 225. TAB layer 230 can comprise either a single sided metal wire or two-sided metal wire. A metal, such as, for example, copper, is electro-deposited onto the TAB layer. Alternatively, a rolled metal can be attached to the TAB layer using an adhesive. Then, the circuitry can be patterned using photolithography and etch processes. When TAB layer 230 comprises a two-sided metal wire, TAB layer 230 can also serve as the package substrate for device 200. Therefore, in this embodiment of FIG. 2, device 200 can optionally eliminate the need for a separate package substrate, such as package substrate 120 in FIG. 1. Also in this embodiment, device 200 can also include solder balls at the exposed portion of TAB layer 230 that faces away from semiconductor chip 205.

Another type of bonding that can be used to electrically couple the first security layer to the semiconductor chip is wire bonding. FIG. 6 demonstrates an exemplary embodiment using wire bonding. In the embodiment shown if FIG. 6, wires 626 connect both first security layer 610 and semiconductor chip 605 to the package substrate (not shown). Other embodiments also can have wires that connect the first security layer directly to the semiconductor chip.

An integrated circuit devices described herein also comprise an encapsulant. The encapsulant covers at least a portion of the security layer and the semiconductor chip. As shown in FIG. 1, encapsulant 115 can be located over package substrate 120 and cover all of semiconductor chip 105, security layer 110, and solder balls 122 and 124. Similarly, as shown in FIG. 2, encapsulant 215 can cover all of semiconductor chip 205, security layer 210, and solder balls 222 and 225, and encapsulant 215 can cover a part of TAB layer 230 and leave a portion of TAB layer 230 exposed to permit TAB layer 230 to electrically couple to another device or a printed circuit board.

The encapsulant can comprise a plastic material. As an example, the encapsulant can comprise an epoxy resin.

The encapsulant and the security layer can comprise materials that have similar chemical characteristics. In this embodiment, the security layer and the encapsulant will be etched by the same chemicals. Therefore, if the encapsulant should happen to be etched when a hacker is attempting to reverse engineer the device, the security layer will also be etched and destroyed, thereby thwarting the hacker's attempt to reverse engineer the device.

Additionally, it is desirable for the security layer and the encapsulant to have coefficients of thermal expansion (CTEs) that are similar to each other. If the CTEs are too dissimilar, the security layer and/or the encapsulant can crack during the heating and cooling of the device when it is being manufactured and used. Therefore, in one embodiment, the CTE for the encapsulant and the security layer can be substantially matched. It should be noted that the pliability (elastic modulus) of plastic materials that can be used in the first security layer and the encapsulant reduces the stress in situations when there is a mismatch between the CTEs of the security layer and the encapsulant.

Any TAB layer present and the encapsulant and security layer also can be similar chemically. For example, the TAB layer can be etched by chemicals that also etch the encapsulant and the security layer. Therefore, if the encapsulant should happen to be etched when a hacker is attempting to reverse engineer the device, the TAB layer will also be etched and destroyed, thus rendering the semiconductor chip inoperable.

An exemplary embodiment can also include a second security layer. The second security layer can be located at a side of the semiconductor chip opposite of the first security layer or at the same side of the semiconductor chip as the first security layer.

Figure 3:
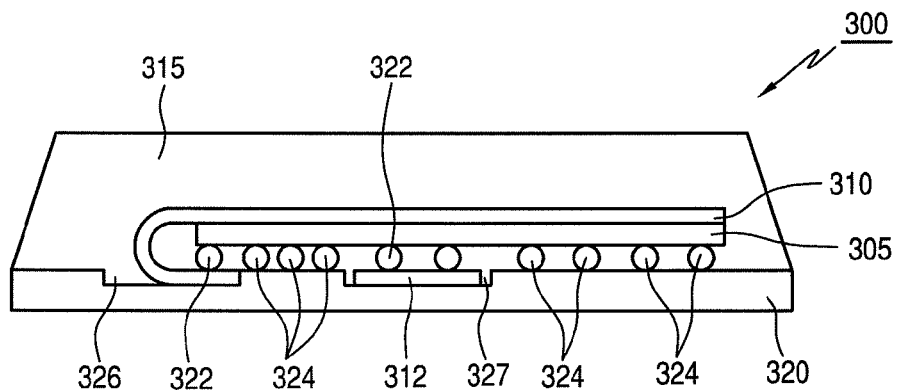
FIG. 3 is a cross-sectional view of an example of an integrated circuit device according to another embodiment.

FIG. 3 shows an exemplary embodiment of a cross section of integrated circuit device 300. Device 300 comprises semiconductor chip 305, first security layer 310, second security layer 312, encapsulant 315, package substrate 320, solder balls 322 and 324. Semiconductor chip 305, encapsulant 315, and package substrate 320 in device 300 of FIG. 3 can be similar to semiconductor chip 105, encapsulant 115, and package substrate 320, respectively, of FIG. 1.

First security layer 310 and second security layer 312 that are positioned at the top side and bottom side of semiconductor chip 305. First and second security layers 310 and 312 in FIG. 3 can be similar to security layer 110 in FIG. 1. For example, first and second security layers 310 and 312 can comprise a PEN substrate and a TFT memory capable of storing all of or portions of a security key.

Second security layer 312 is electrically coupled to semiconductor chip 305 via solder balls 328. First security layer 310 is electrically coupled to semiconductor chip 305 via solder balls 322. Solder balls 324 provide communication and/or power between package substrate 320 and semiconductor chip 305.

Package substrate 320 includes recesses 326 and 327. A portion of first security layer 310 is located in recess 326, and all of second security layer 312 is located in recess 327. Recess 326 in FIG. 3 can be similar to recess 126 in FIG. 1.

Figure 4:
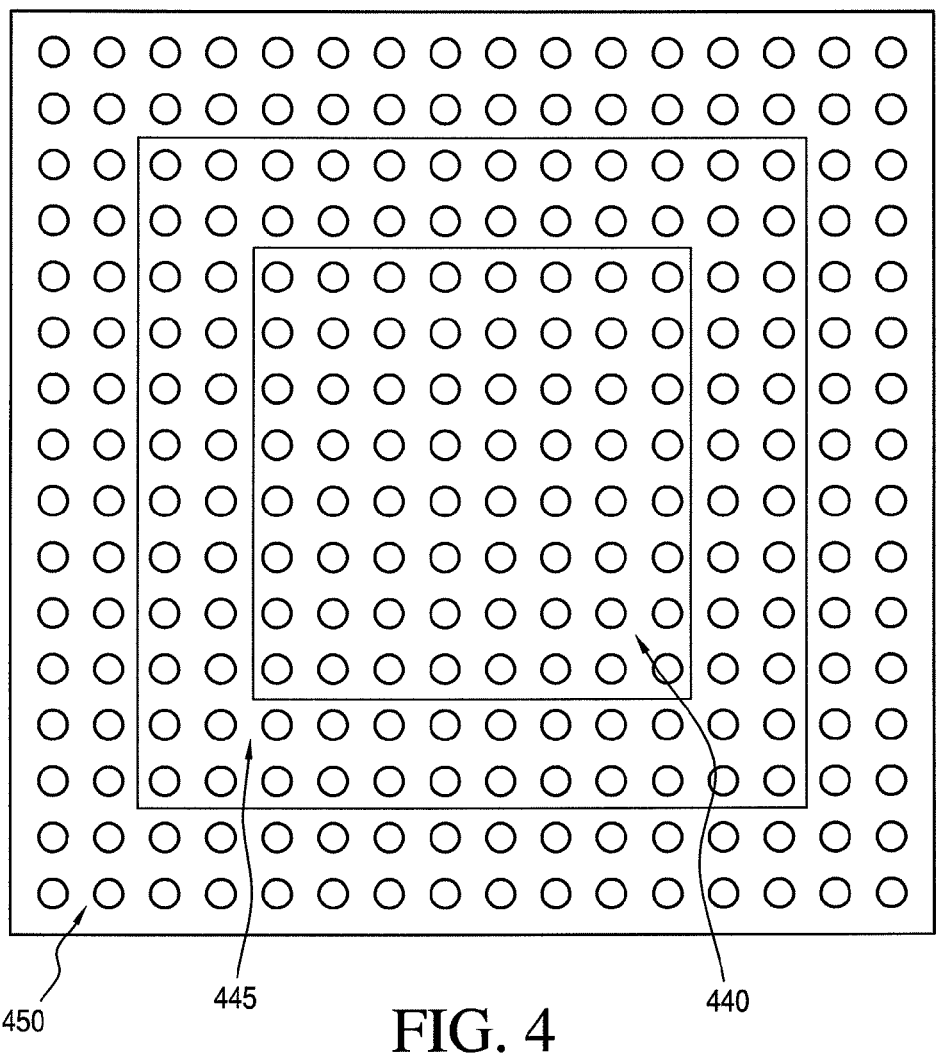
FIG. 4 is a top view of an example of a semiconductor chip of the integrated circuit device according to the embodiment of FIG. 3.

FIG. 4 show an example of a top view of the solder balls of the top side of a semiconductor chip where a second security layer is to be coupled to a top side of the semiconductor chip. As an example, the semiconductor chip can be semiconductor chip 305 in FIG. 3, the second security layer can be second security layer 312 in FIG. 3. In FIG. 4, three distinct zones are illustrated at the top side of the semiconductor chip. These zones are a communication zone 450, a power zone 445, and a security zone 440. Security zone 440 provides pads or balls for connection with the ball or pad side of the second security layer. Power zone 445 comprise pads or balls that connect the semiconductor chip to a package substrate such as, for example, package substrate 320 in FIG. 3. Communication zone 450 comprise pads or balls that connect the semiconductor chip to the package substrate and/or to the first security layer. As an example, communication zone 450 can provide input/output (I/O) and/or power and ground (e.g., VDDIO and VSSIO) pads or balls.

Similarly, FIG. 5 shows an embodiment of a top view of a semiconductor chip with the three zones mentioned above. The pattern of security zone 540 is changed to a more random looking configuration. Power zone 545, as shown in the boxes in FIG. 5, are also at more random locations. It should be noted that any configuration of the power zone, communication zone, and security zone can be used. Communication zone 550 remains at the perimeter of the semiconductor chip. In a different embodiment, the relative locations of the security zone, the power zone, and the communication zone can be different than the relative locations shown in FIGS. 4 and 5.

Figure 7:
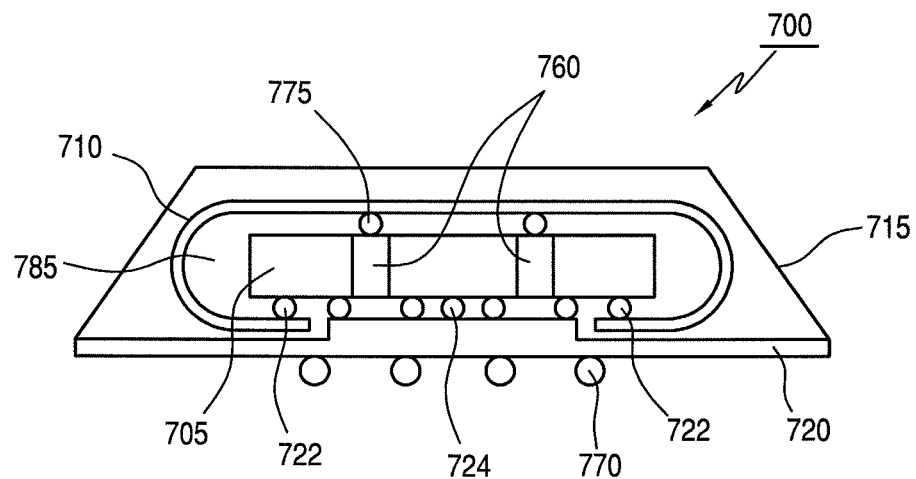
FIG. 7 is a cross-sectional view of an example of an integrated circuit device according to another embodiment.
Figure 8:
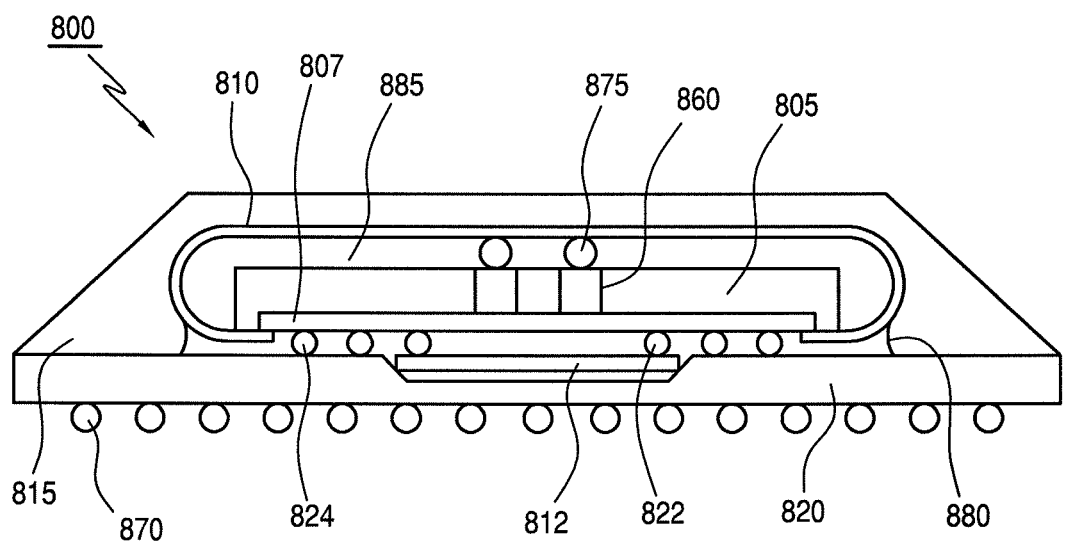
FIG. 8 is a cross-sectional view of an example of an integrated circuit device according to another embodiment.

FIGS. 7 and 8 illustrate cross-sectional views of exemplary embodiments in which semiconductor chips have vias extending from one surface of the semiconductor chips to an opposite surface of the semiconductor chips.

With respect to FIG. 7, integrated circuit device 700 is shown. Device 700 includes semiconductor chip 705, security layer 710, encapsulant 715, package substrate 720, and solder balls 722 and 724, which can be similar to semiconductor chip 105, security layer 110, encapsulant 115, package substrate 120, and solder balls 122 and 124, respectively, in FIG. 1.

Semiconductor chip 705 comprises electrically conductive vias 760 extending through semiconductor chip 705 from one side to the other. Semiconductor chip 705 comprises an integrated circuit formed at the side of semiconductor chip 705 that faces towards package substrate 720. First security layer 710 couples to the integrated circuit of semiconductor chip 705 by way of vias 760 and solder balls 775 from the bottom side of semiconductor chip 705 to the top side of semiconductor chip 705. Optionally, first security layer 710 also can connect with semiconductor chip 705 by way of solder balls 722, which are positioned at the top side of semiconductor chip 705. Semiconductor chip 705 is coupled to package substrate 720 with solder balls 724. The package substrate can be electrically coupled to a printed circuit board (not shown) via solder balls 770. To eliminate the presence of any voids or air gaps inside integrated circuit device 700, device 700 comprises an underfill 785. Underfill 785 can comprise an epoxy resin that is similar to encapsulant 715 and can be located between semiconductor chip 705 and package substrate 720.

Similarly, FIG. 8 shows an exemplary embodiment in which integrated circuit device 800 includes semiconductor chip 805, first security layer 810, encapsulant 815, package substrate 820, and solder balls 824, which can be similar to semiconductor chip 105, first security layer 110, encapsulant 115, package substrate 120, and solder balls 124, respectively, in FIG. 1. Device 800 also includes second security layer 812 and solder balls 822, which can be similar to second security layer 312 and solder balls 328, respectively, in FIG. 3. Device 800 in FIG. 8 shows a location of integrated circuit 807 of semiconductor chip 805. As shown, integrated circuit 807 is located towards the top side of semiconductor chip 805. FIG. 8 also shows vias 860 of semiconductor chip 805, which can be similar to vias 760 of semiconductor chip 705 in FIG. 7.

First security layer 810 electrically couples to integrated circuit 807 by way of solder balls 815 and vias 860. FIG. 8 illustrates first security layer 810 wrapping around opposite sides of semiconductor chip 805, but in a different embodiment, first security layer 810 is located only at the bottom side of semiconductor chip 805 where solder balls 815 are located. Second security layer 812 electrically couples with integrated circuit 807 via solder balls 822, and second security layer 812 and solder balls 822 are located at the top side of semiconductor chip 805.

Furthermore, FIG. 8 shows underfill 880 located between semiconductor chip 805 and package substrate 820, and also shows fill 885 located between first security layer 810 and semiconductor chip 805. Underfill 880 and fill 885 are used to ensure that there are no voids or air gaps inside device 800. Underfill 880 and fill 885 can comprise an epoxy resin. The other embodiments of integrated circuit devices shown and/or described herein can also include materials similar to underfill 880 and fill 885.

In another embodiment, first security layer 810 or a different security layer 810 can serve as a Faraday cage for device 800. As an example, first security layer 810 can comprise a PEN substrate supporting a metal wiring pattern that can block electromagnetic radiation entering into or exiting from device 800. In this example, first security layer 810 can serve as the Faraday cage and can wrap around semiconductor chip 805 as shown in FIG. 8. In a first embodiment of this example, first security layer 810 does not store any portion of the security key, and second security layer 812 is be capable of storing at least a portion of the security key. In a second embodiment of this example, first security layer 810 serves as the Faraday cage and also stores at least a portion of the security key. In this second embodiment of this example, the presence of second security layer 812 in device 800 is optional.

Figure 9:
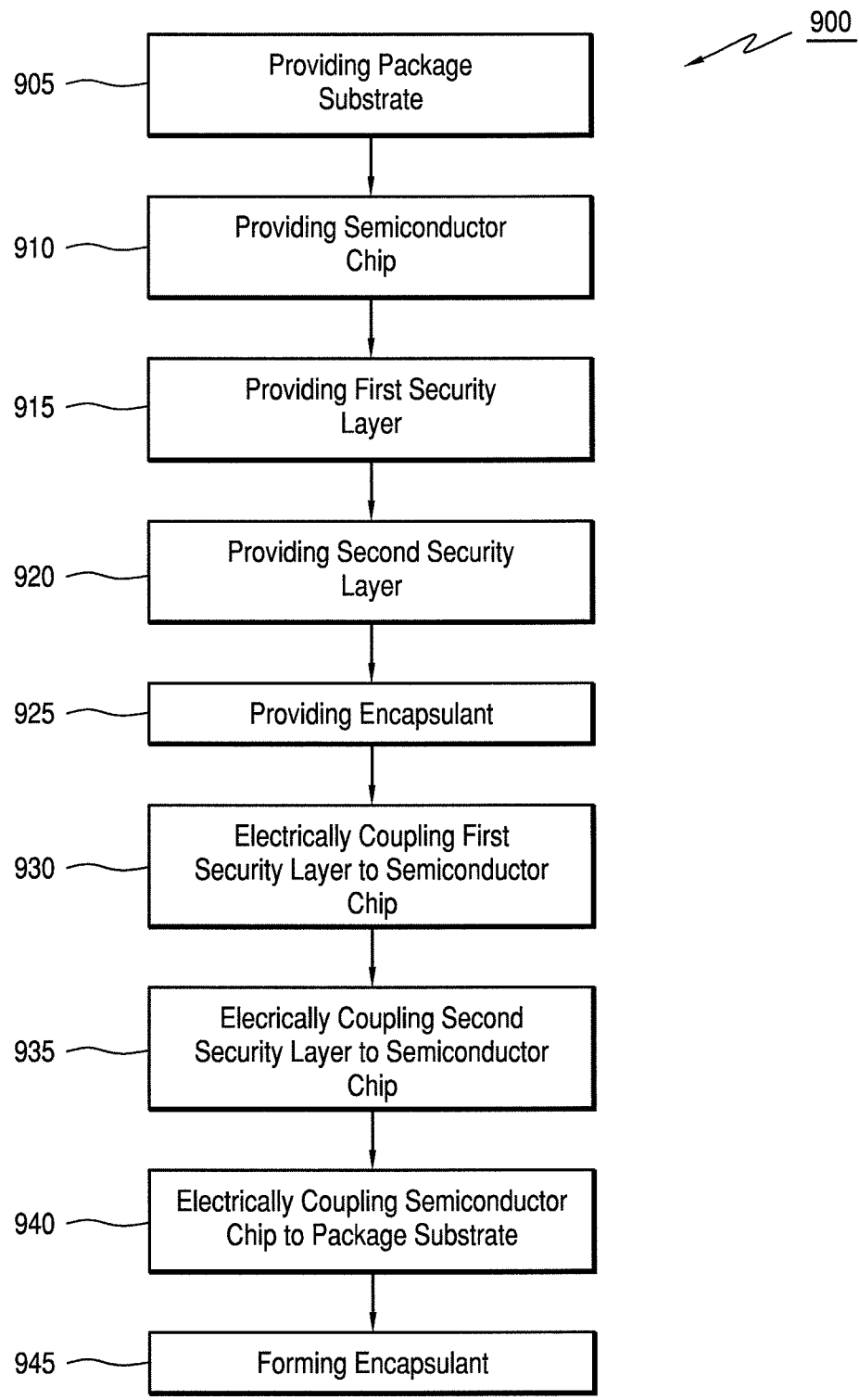
FIG. 9 is a flow chart illustrating an example of a method for making an integrated circuit device according to another embodiment.

FIG. 9 illustrates a flow chart of method 900 for making an integrated circuit device. Method 900 is merely exemplary and is not limited by the embodiments herein. Method 900 can be performed in many different embodiments or examples not specifically depicted or described herein. For example, some of the blocks in the flow chart can occur in an order different than that depicted in the flow chart of FIG. 9.

Method 900 includes: providing a package substrate (block 905); providing a semiconductor chip (block 910); providing a first security layer (block 915); optionally providing a second security layer (block 920); and providing an encapsulant (block 925). Each of these blocks can occur before or after the others, and each of these blocks can be performed by manufacturing or purchasing the package substrate, the semiconductor chip, the one or more security layer, and the encapsulant. A package substrate, a semiconductor chip, a first security layer, an optional second security layer, and an encapsulant were described above in various embodiments.

The flow chart of method 900 also includes electrically coupling the first security layer to the semiconductor chip (block 930). As described above, the first security layer can be coupled to the semiconductor chip via gang bonding, thermosonic bonding, TAB bonding, wire bonding, etc. The exemplary embodiment depicted in FIG. 2 shows an integrated circuit device having TAB bonding. Similarly, the exemplary embodiment of FIG. 6 depicts an embodiment of an integrated circuit device having wire bonding, and FIG. 1 shows an exemplary embodiment illustrating gang or thermosonic bonding. In addition, the semiconductor chip and the first security layer can be coupled together by way of vias as shown in the exemplary embodiments of FIGS. 7 and 8.

When the integrated circuit device includes a second security layer, the second security layer can be electrically coupled to the semiconductor chip (block 935). The second security layer can be coupled to the semiconductor chip using any of the methods discussed above.

Method 900 can further include electrically coupling the semiconductor chip to the package substrate (block 940). Once again, any of the coupling methods discussed above can be used in this step.

Blocks 930, 935, and 940 of the flow chart in method 900 can be completed in any order or simultaneously with each other in some embodiments. As discussed above in various embodiments, the semiconductor chip should be positioned adjacent to the first security layer. The first security layer can be positioned so that it is at the opposite side of the semiconductor chip from the package substrate. The first security layer can also be positioned so that it is adjacent to the semiconductor chip and between the semiconductor chip and the package substrate.

When present, the second security layer can also be positioned adjacent to the semiconductor chip. The second security layer can be adjacent to the side of the semiconductor chip opposite of the first security layer, or the second security layer can be adjacent to the same side of the semiconductor as the first security layer. FIG. 3 illustrates an exemplary embodiment of a first security layer and a second security layer at opposite sides of a semiconductor chip. FIGS. 4 and 5 illustrate exemplary embodiments of how a first or second security layer can attach to the top side of the semiconductor chip.

Method 900 also includes forming an encapsulant over the semiconductor chip and the first and second security layers, among other components of the integrated circuit device (block 945). As described above, the encapsulant and first security layer can have similar chemistries. Likewise, the encapsulant and second security layer can have similar chemistries. The encapsulant extends from the package substrate and can encase at least a portion of the semiconductor chip and the first security layer and second security layer. The encapsulant also can encase all of the first and second security layers as well as the semiconductor chip. These embodiments are demonstrated in the exemplary embodiments illustrated in FIGS. 1, 2, 3, 6, 7, and 8.

Furthermore, the first security layer and second security layer can be programmed with at least a portion of the security key in their respective memories. The programming of the memory with a portion of the security can take place after the encapsulant is formed. The programming of the memory can also take place before the encapsulant is formed.

If the memory is programmed before the encapsulant is formed, the memory also can be programmed before the corresponding security layer is electrically coupled to the semiconductor chip. The programming can also occur after the corresponding layer has been electrically coupled to the semiconductor chip. If the memory is a ROM comprising fuses, the memory can be programmed with all of or a portion of the security key before the encapsulant is formed and before the corresponding security layer is electrically coupled to the semiconductor chip. In the same embodiment where the memory is a ROM comprising fuses, the memory can also be programmed with the security key after the encapsulant is formed and/or after the corresponding security layer is electrically coupled to the semiconductor chip. In a different embodiment, a first portion of the memory is programmed in a security layer before the encapsulant is formed, and a second portion of the memory is programmed in the same or different security layer after the encapsulant is formed. Regardless of how many security layers are used, a portion of the security key optionally can also be programmed in a memory of the semiconductor chip. Programming the portion of the security in the memory of the semiconductor chip can occur after the encapsulant is formed.

Figure 10:
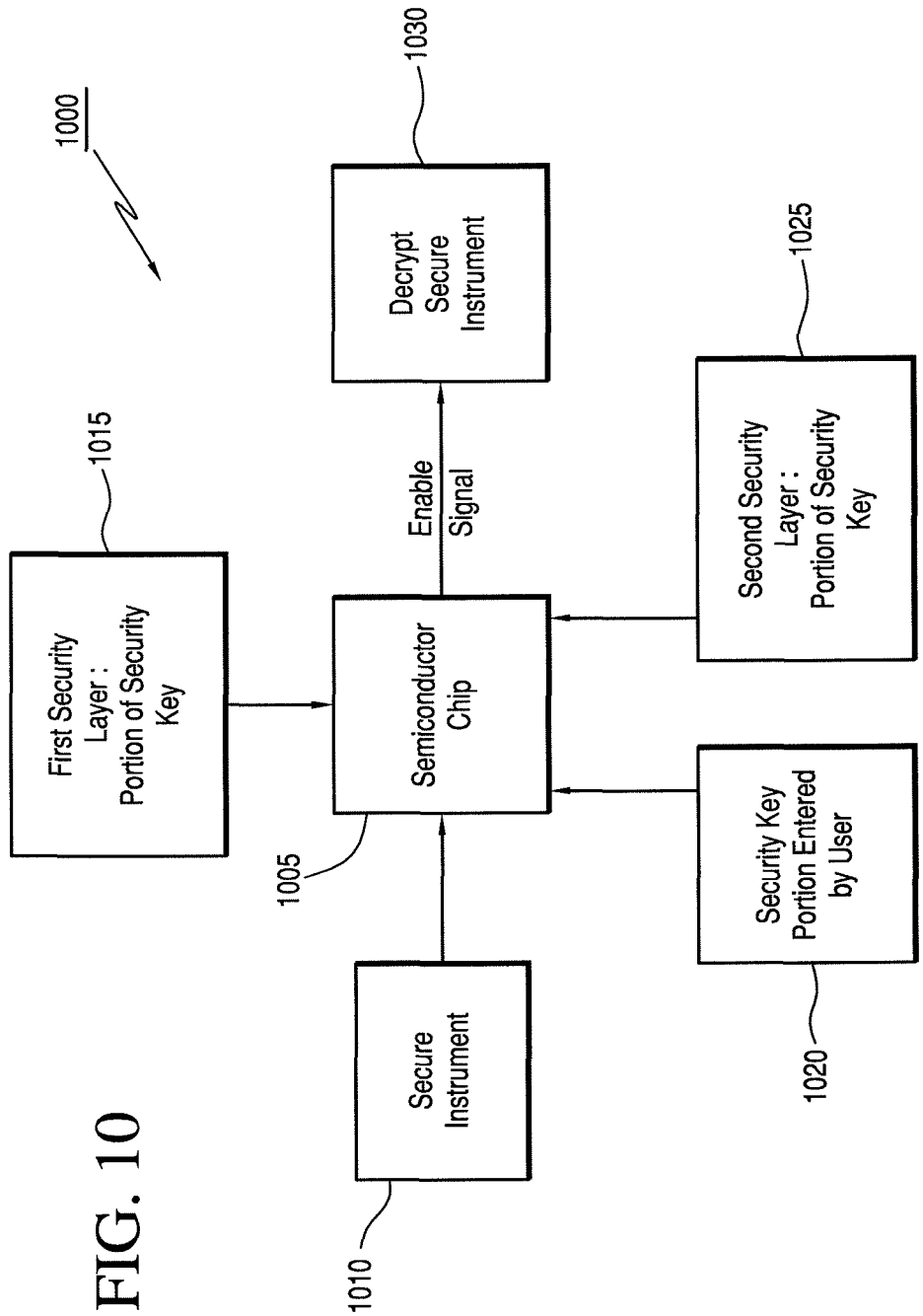
FIG. 10 is a flow chart illustrating an example of a method for using an integrated circuit device according to another embodiment.

FIG. 10 depicts a flow chart of method 1000 for using an integrated circuit device. Method 1000 is merely exemplary and is not limited by the embodiments herein. Method 1000 can be performed in many different embodiments or examples not specifically depicted or described herein. The numbering of the blocks in the flow chart of method 1000 does not represent the sequence of performing the actions represented by the blocks.

Block 1010 of the flow chart of method 1000 shows a secure instrument being sent to the semiconductor chip. The secure instrument can comprise any type of document, file, digital media, network link, or other communication that is to remain secure. In addition, the secure instrument has been encrypted in some fashion.

Block 1015 shows a portion of the security key that is stored in the memory of the first security layer being sent to the semiconductor chip. Likewise, block 1025 shows a portion of the security key stored in the memory of the second security layer being sent to the semiconductor chip. The semiconductor chip can send a command to the first and second security layers to receive a portion of the key stored in the memory of the respective security layer. In response, that security layer will send the portion of the key back to the semiconductor chip.

Block 1020 shows a portion of the security key entered in real time or previously by a user being sent to the semiconductor chip. The user can enter the key as a PIN, a password, or the like. The user can enter the portion of the key by typing, pronouncing, or otherwise entering the predetermined information into a device in which the semiconductor chip is located. For example, the semiconductor chip can be located in a computer, a personal digital assistant (PDA), or a smart phone. The user enters his key into that device, which sends the key to the semiconductor chip. Blocks 1015, 1020, and 1025 occur after block 1010, but the relative sequence of blocks 1015, 1020, and 1025 can be varied. One or more of blocks 1015, 1020, and 1025 can be optional.

Block 1005 of method 1000 shows the semiconductor chip sending a signal to enable the secure instrument to be decrypted. To enable the instrument to be decrypted, the semiconductor chip verifies that the key is correct. The semiconductor chip receives each of the portions of the key: one from the first security layer, one from the second security layer, one from the user, and one that is stored in the memory of the semiconductor chip. Next the semiconductor chip combines the portions of the key to create a combined security key as it is instructed to do when programmed. If the combined security key is correct, the semiconductor chip will send a signal allowing the secure instrument to be decrypted, or perform the decryption and transmit the decrypted result to the circuit board.

Block 1030 of method 1000 shows the secure instrument being decrypted by the semiconductor chip. Block 1030 is performed after block 1005.

Although the invention has been described with reference to specific embodiments, it will be understood by those skilled in the art that various changes can be made without departing from the spirit or scope of the invention. For example, a integrated circuit device can include more than two security layers. In addition, not every security layer must necessarily include a portion of the security key. Likewise, the user does not need to be instructed to enter a portion of the security key as shown in method 1000. Accordingly, the disclosure of embodiments is intended to be illustrative of the scope of the invention and is not intended to be limiting. It is intended that the scope of the invention shall be limited only to the extent required by the appended claims. To one of ordinary skill in the art, it will be readily apparent that the integrated circuit device and its methods of manufacture and use discussed herein may be implemented in a variety of embodiments, and that the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An integrated circuit device comprising:
   an encapsulant;
   a semiconductor chip;
   a package substrate;
   a first security layer electrically coupled to the semiconductor chip; and
   a second security layer electrically coupled to the semiconductor chip;
   wherein:
      the first security layer comprises a memory configured to store at least a first portion of a security key;
      the semiconductor chip is electrically coupled to the package substrate;
      the encapsulant covers portions of the semiconductor chip and the first security layer;
      the second security layer comprises a memory configured to store at least a second portion of the security key; and
      the first security layer and the second security layer are located at opposite sides of the semiconductor chip.

2. The integrated circuit device of claim 1 wherein at least one of:
   the memory of the first security layer comprises a programmable memory;
   the memory of the first security layer comprises fuses; or
   the memory of the first security layer comprises a thin film transistor circuit.

3. The integrated circuit device of claim 1 wherein:
   the memory of the first security layer comprises a thin film transistor circuit; and
   the thin film transistor circuit comprises at least one of amorphous silicon, nano-crystalline silicon, poly-crystalline silicon, zinc oxide, mixed metal oxide, cadmium selenium, or organic material.

4. The integrated circuit device of claim 1 wherein at least one of:
   the first security layer comprises transistors having threshold voltages that degrade over time with use; or
   the first security layer comprises plastic.

5. The integrated circuit device of claim 1 wherein:
   the encapsulant comprises plastic.

6. The integrated circuit device of claim 1 wherein:
   the encapsulant comprises an epoxy resin.

7. The integrated circuit device of claim 1 wherein:
   the semiconductor chip comprises a memory configured to store the at least the second portion of the security key, the memory of the semiconductor chip comprising the memory of the second security layer.

8. The integrated circuit device of claim 1 wherein:
   the second security layer comprises a Faraday cage located over the semiconductor chip.

9. The integrated circuit device of claim 1 wherein one of:
   the first security layer is located between the package substrate and the semiconductor chip; or
   the semiconductor chip is located between the first security layer and the package substrate.

10. The integrated circuit device of claim 1 wherein:
    the semiconductor chip comprises vias extending from a first side of the semiconductor chip to a second side of the semiconductor chip;
    the semiconductor chip further comprises an integrated circuit at the first side of the semiconductor chip;
    the first security layer is located at the second side of the semiconductor chip; and
    the first security layer is electrically coupled from the second side of the semiconductor chip through the vias to the integrated circuit at the first side of the semiconductor chip.

11. A method of making an integrated circuit device, the method comprising:
    electrically coupling a first security layer to a semiconductor chip, wherein the first security layer is configured to store at least a first part of a security key;
    electrically coupling the semiconductor chip to a package substrate;
    forming an encapsulant over the semiconductor chip and the first security layer such that the semiconductor chip and the first security layer are enclosed between the encapsulant and the package substrate; and
    electrically coupling a second security layer to the semiconductor chip.

12. The method of claim 11 further comprising one of:
    programming the at least the first part of the security key in the first security layer after forming the encapsulant; or
    programming the at least the first part of the security key in the first security layer before forming the encapsulant.

13. The method of claim 11 wherein electrically coupling the first security layer to the semiconductor chip comprises at least one of:
    tape automated bonding the first security layer to the semiconductor chip;
    gang bonding the first security layer to the semiconductor chip;

wire bonding the first security layer to the semiconductor chip; or thermosonic flip-chip bonding the first security layer to the semiconductor chip.

14. The method of claim 11 further comprising:
programming at least a second part of the security key into a memory of the semiconductor chip.

15. The method of claim 11 wherein:
electrically coupling the first security layer to the semiconductor chip comprises electrically coupling the first security layer to the semiconductor chip at a first side of the semiconductor chip; and
electrically coupling the second security layer to the semiconductor chip comprises electrically coupling the second security layer to the semiconductor chip at a second side of the semiconductor chip that is opposite of the first side of the semiconductor chip.

16. The method of claim 11 wherein:
electrically coupling the first security layer to the semiconductor chip comprises electrically coupling the first security layer to the semiconductor chip at a first side of the semiconductor chip and between the semiconductor chip and the package substrate; and
electrically coupling the second security layer to the semiconductor chip comprises electrically coupling the second security layer to the semiconductor chip at the first side of the semiconductor chip.

17. The method of claim 11 wherein:
electrically coupling the first security layer to the semiconductor chip comprises electrically coupling the first security layer to the semiconductor chip at a side of the semiconductor chip opposite of where the package substrate is electrically coupled to the semiconductor chip.

18. The method of claim 14 wherein:
programming the at least the second part of the security key into the memory of the semiconductor chip comprising programming the at least the second part of the security key into a memory of the second security layer, the memory of the semiconductor chip comprising the memory of the second security layer.

* * * * *